United States Patent [19]

Gregory et al.

[11] Patent Number: 5,264,768
[45] Date of Patent: Nov. 23, 1993

[54] ACTIVE HAND CONTROLLER FEEDBACK LOOP

[75] Inventors: William W. Gregory, St. Petersburg; Jeffrey W. Hegg, North Redington Beach; Wayne E. Lance, Largo, all of Fla.

[73] Assignee: Honeywell, Inc., Minneapolis, Minn.

[21] Appl. No.: 957,278

[22] Filed: Oct. 6, 1992

[51] Int. Cl.⁵ .............................. G05B 11/01
[52] U.S. Cl. ................... 318/561; 318/568.17; 318/632; 318/628; 74/471 XY; 336/135; 244/236
[58] Field of Search ............... 318/560–663, 318/139, 628; 74/491, 523, 471 XY; 244/223, 228, 236, 237, 234; 200/6 A, 6 R; 901/22, 34; 340/870.32, 870.35; 338/128

[56] References Cited

U.S. PATENT DOCUMENTS

| | | |
|---|---|---|
| 3,270,260 | 8/1966 | Mehr ............................ 317/255 |
| 4,095,763 | 6/1978 | Builta ........................... 318/564 |
| 4,150,803 | 4/1979 | Fernandez ................. 244/135 A |
| 4,163,929 | 8/1979 | Janu et al. .................... 318/628 |
| 4,306,208 | 12/1981 | Coors ........................... 336/136 |
| 4,544,803 | 10/1985 | Schaller ....................... 336/135 |
| 4,639,668 | 1/1987 | Petit et al. ................ 74/471 XY |

Primary Examiner—Paul Ip
Attorney, Agent, or Firm—Albin Medved

[57] ABSTRACT

An active hand controller system is provided wherein a feedback loop detects the position of a control stick to control a motor driving the control stick to thereby provide certain force feel characteristics to the control stick. The feedback loop includes a detector for detecting force exerted for the control stick to generate a signal indicative of the force or torque being applied to the control stick. In a more specific aspect, the invention includes the use of variable reluctance transformers, preferably in a push/pull configuration to detect the forces being exerted on the control stick.

6 Claims, 6 Drawing Sheets

ACTIVE HAND CONTROLLER FEEDBACK LOOP

CROSS REFERENCE TO RELATED APPLICATIONS

This application is related to application Ser. No. 07/957, and application Ser. No. 07/957,427, concurrently filed herewith.

BACKGROUND OF THE INVENTION

This invention is related to an active hand control system of the type wherein manual control input devices such as control sticks employed in a servo-coupled system are provided with an electrically-simulated variable rate feel. In particular, the invention relates to a system having a control stick such as is employed in aircraft, which is servo-coupled to the control system of the aircraft through electronics and a motor mechanism. The electronics and motor mechanism provide a simulated feel to the control stick when in operation which is similar to that of a purely mechanical system.

Servo control technology is well developed as applied in use in the field of robotics. In particular, electrical motor and servo control systems have been developed and employed in the past in the design of robotic hand controllers which are capable of reflecting forces experienced at the robotic end, back to, for example, a human operator.

One example of the type of control system to which the present invention is directed is disclosed in U.S. Pat. No. 4,150,803, which teaches a control stick for an operator having an electro-simulated variable rate feel. The simulated feel of the device of U.S. Pat. No. 4,150,803 is provided by a system which generates for the operator at the control stick the proper force and feel characteristics when used to control a boom employed during refueling operations between aircraft in flight.

These types of controllers generally involve the use of a control stick which is actuatable in at least two mutually perpendicular planes to provide both vertical and lateral control of the device being controlled. This invention could be apppplied to controllers moveable in three rotational or three transtational axes with up to six degrees of freedom. An example of a two degree of freedom control stick is shown in U.S. Pat. No. 3,270,260 in which the control stick of the device has electrical pickup means in plate form, for example, capacitance bridge circuits arranged in a symmetrical arrangement such that a force exerted on the stick having a symmetrical arrangement of circuits unbalances them and produces a signal which is proportional to the force on the stick. The signals generated by the electrical pickups are used to generate output signals through appropriate and conventional electronics, which command a control actuator to effect control of the device being controlled.

Typically, in these systems the control stick is mechanically coupled at its axis to at least one motor which applies either a resisting force on the control stick or, in response to a signal produced by sensors that detect forces applied to the device surfaces being controlled, drives the control stick and in turn, drives the device being controlled to alleviate forces generated by the device under control as felt by the operator.

These types of controllers are particularly desirable for use in the operation of modern day aircraft, in particular, in the form of control sticks or yokes. In operation, the devices as used in the cockpit of aircraft are typically designed to exhibit some desired force versus displacement characteristics to the user whereby the magnitude of the control stick displacement is proportional to the force applied. The pilot controller produces as its output an electrical signal corresponding to the control stick position, and the signal is used to control the aircraft through the action of various motors and mechanical means, in a manner which is well known to those of ordinary skill in the art and is conventional. Thus, in use such systems provide an electronically controlled manual input control stick having force feel characteristics like those of purely mechanically linked systems. These applications in aircraft are typically referred to as "fly by wire" applications. Examples of presently existing applications of this technology are the systems employed in the Airbus A320 Transport Aircraft, the General Dynamics F16 Fighter aircraft and the NASA Space Shuttle.

In the past, in order to enhance or improve the force feel characteristics of such simulated feel control sticks, controller electronics were employed in combination with sensors for detecting the position of the control stick. A signal was generated and processed by controller electronics to drive a motor which in turn drove the control stick to simulate the feel of a mechanical system. Such controller electronics also included input from the system being controlled such as, for example, an auto pilot system or any external forces acting on the flight control surfaces of the aircraft which would, as a result of feedback and input from the surfaces, be input into the controller electronics to be reflected through the motor connected to the control stick at the user location.

While the use of a feedback loop in which the position of the control stick is detected and a signal resulting therefrom is processed by controller electronics to result in a control of a motor to which the control stick is connected to achieve force and feel characteristics typical of a mechanical system has been known, the position detection alone still fails to fully achieve the desired force feel characteristics typical of mechanical systems.

SUMMARY OF THE INVENTION

In accordance with one aspect of the invention there is provided an improvement in an active hand controller system of the type wherein a manual input control stick has its position detected to generate a position signal indicative of the position of the control stick. The position signal is transmitted to a control system for controlling desired elements and is fed back to a control circuit which controls a motor to which the manual control stick is connected. The control circuit generates a signal to control the motor for having the motor exert a force on the manual control stick simulative of a mechanical hand control stick connected to a purely mechanical system. Not only is the position of the control stick detected, but the commutation rate, i.e., the rate of movement of the manual control stick as connected to a gear mechanism to the motor is detected, and the position signal and rate signals are summed prior to processing by the control circuit for providing a control signal to the motor to control the motor to exert the applicable force on the manual control stick. The improvement resides in providing force or torque detecting means connected to the manual control stick for detecting any force or torque exerted on the manual control stick by a user. A signal is generated in response to the force or torque detected and is transmitted to be summed with the commutation rate and position signal to thereafter be processed by the control circuit. The addition of the force detection signal results in a control signal to the motor which eliminates the effects of external operational nonlinearities resulting from electro-mechanical connections of the manual control stick.

In a yet more specific aspect of the invention there are provided electro-magnetic displacement sensing devices, in place of strain gauge sensors, to detect torque or force exerted on the control stick which comprise, for example, variable reluctance transformers or linear variable differential transformers. These sensors are employed mounted and connected to a flexible member, as part of the control stick arrangement, of relatively high stiffness, which member displaces when forces or torques are applied to the control stick.

BRIEF DESCRIPTION OF THE DRAWINGS

Having briefly described the invention, the same will become better understood from the following discussion thereof which is made with reference to the attached drawings wherein.

DETAILED DISCUSSION OF THE INVENTION

Figure 1:
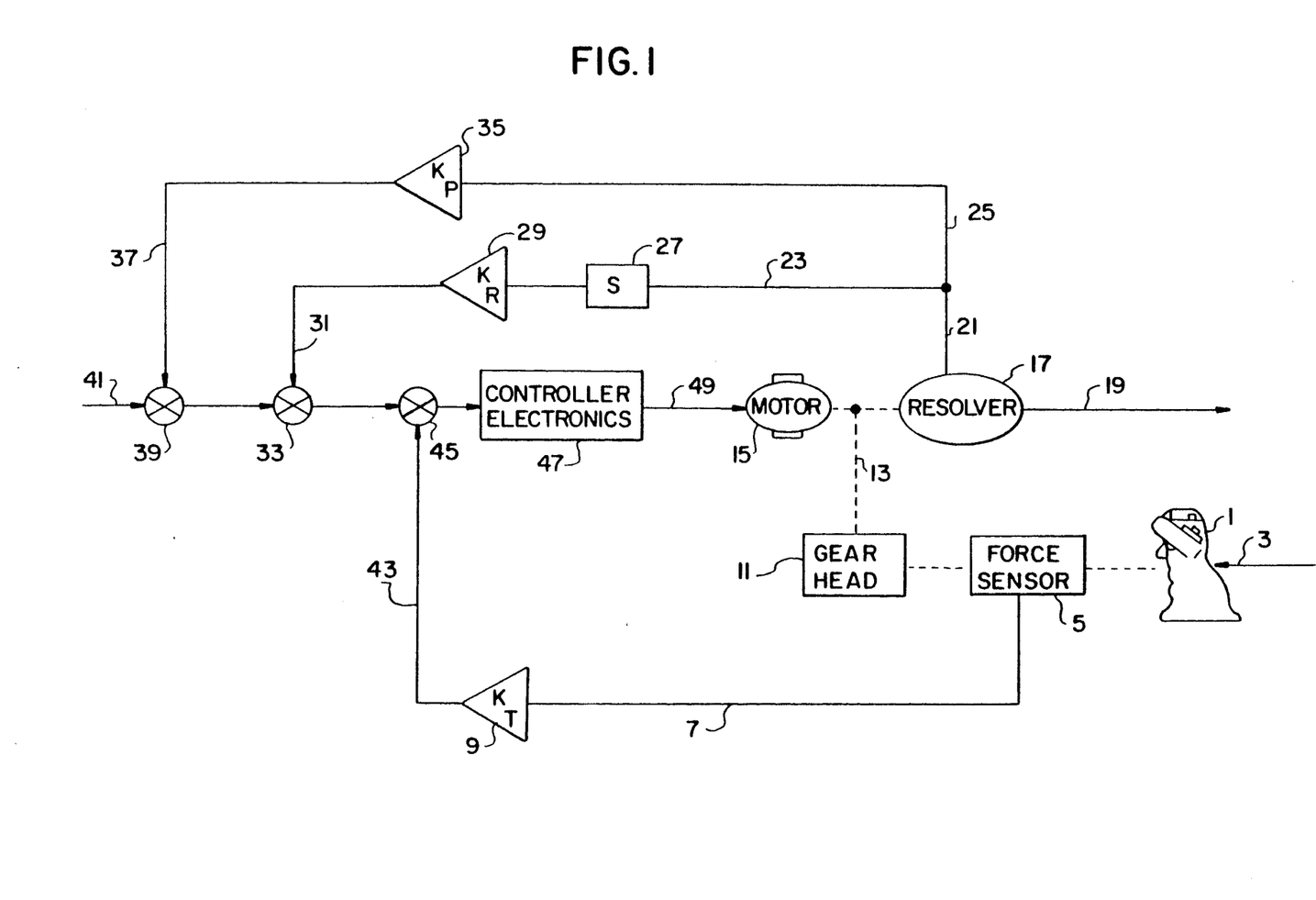
FIG. 1 is a first embodiment of the control system electronics in accordance with the invention employing a force or torque sensor in a feedback loop.

FIG. 1 is a schematic diagram illustrating the typical control electronics for controlling a motor which drives a manual hand controller such as a control stick in an active hand controller system. Both the portions of hand controller systems employed in the prior art, as well as the improvement in accordance with the invention are shown.

The control stick 1 has a hand grip which has a force 3 applied thereto, for example, by a pilot to cause the control stick 1 to move. The control stick 1 is typically connected to a gear mechanism including a gear head 11 which has a resolver 17 connected thereto. The resolver 17, in response to movement of the gear head 11, which movement is detected, generates a signal through line 19 which is passed to the system being controlled by the control stick 1. Simultaneously, the signal from resolver 17 is also passed through line 21 into line 23 wherein it is operated on at differentiating block 27. At differentiating block 27 the signal from resolver 17, which is a position indicative signal, is operated on, for example, by differentiation, e.g., a La Place transform, to obtain a signal which is representative of velocity of the control stick 1. The resulting velocity signal is then passed through amplifier 29 through line 31 into summing device 33. Likewise, the position signal from resolver 17 is also passed through line 21 to line 25 to be amplified at amplifier 35, and passed through line 37 to be summed at summing device 39, with any signal coming through line 41 from the system being controlled, for example, an autopilot signal, or signals resulting from the effects of physical forces being applied to the devices being controlled by the system.

The position signal, as summed with any external signals coming in through line 41, are then passed to summing device 33 to be summed with the velocity signal, and the then summed signals are passed to summing device 45 to be passed into controller electronics 47 which are conventional and known to those of ordinary skill in this art, to be operated on therein to result in a motor control signal. The resultant motor control signal is then passed through line 49 to control motor 15 which acts through the gear head 11 to provide movement or apply a force to the control stick 1 to simulate the force feel characteristics of purely mechanical systems.

In accordance with the embodiment of FIG. of the invention, a force or torque sensor 5 is also connected to the control stick 1 to generate a force signal representative of any force 3 being applied to control stick 1. The force sensor 5 passes the force signal generated through line 7 to be amplified at amplifier 9 and then passed through line 43 to be summed at summing device 45 and passed to controller electronics 47. By inclusion of the force signal, the system characteristics are significantly enhanced. More particularly, the force or torque loop described increases bandwidth and improves linearity of the system by compensating for gimbal and motor inertial forces and for non-linearities introduced by gear teeth, motor cogging, friction, hysterisis, and other external forces, thereby resulting in operational smoothness.

While the force or torque detector 5 can be a conventional detector, for example, strain gauge type devices such as are commercially available from Sensotec, Inc., in one aspect in accordance with this invention as will be later described, an improvement in the system is provided using in place of such strain gauge sensors, electromagnetic displacement sensing devices such as variable reluctance transformers or linear variable differential transformers (LVDT's) as arranged in a unique mechanical structure as will be described with reference to FIGS. 4a and 4b.

Figure 2:
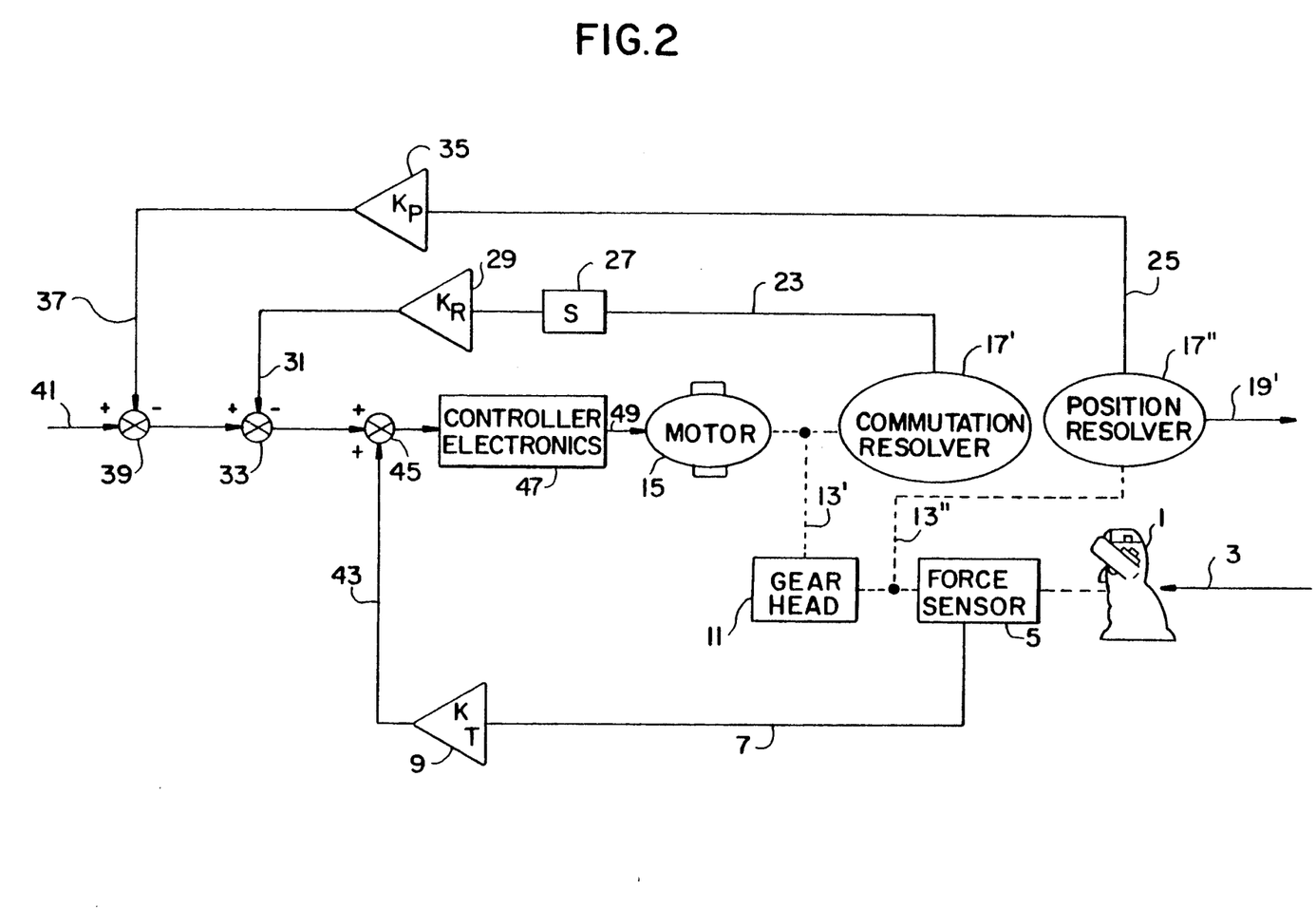
FIG. 2 is an alternative circuit diagram of the control electronics in accordance with the invention.

In the embodiment shown in FIG. 2 there is a further modification over the embodiment of FIG. in that the resolver 17 of FIG. 1 is replaced by two separate devices, a commutation resolver 17' which detects the position of the control stick 1 through line 13' connected to the gear head and transmits its signal through line 23 to be operated on by differential block 27 to result in a velocity signal which is then amplified by amplifier 29. Similarly, a position resolver 17" detects the position of the control stick through lines 13" and transmits a control signal through line 19' to the system and simultaneously feeds the position signal back through line 25 and amplifier 35 through line 37 to be summed at summing device 39. The difference from the embodiment of FIG. 1 is that in FIG. 1, the resolver 17 was used to generate both a position as well as velocity signal directly from the gear head 11 through line 13. In the case of the embodiment of FIG. 2, a commutation resolver 17' picks up the rate of movement of the motor 15' rotor whereas the position resolver 17'' directly picks up the position of the control stick 1 by connection to the control stick as will be described in greater detail with reference to FIG. 6, which shows the commutation resolver 17' connected to the motor 15 and the position resolver 17'' connected to the control stick 1 at a gimbal 145.

In the case of the controller electronics 47 in both FIGS. 1 and 2, it is noted that these devices are conventional and well know to those in ordinary skill in the art. Typical of such controller electronics are what are known as proprotional controllers, integral controller and multiple integral controllers. In the case of this invention it is preferrred that the controller electronics be integral controllers. Thus, the controller electronics need not be discussed any greater detail other than to state that they are conventional electronics, well known to those of ordinary skill in this art, which process feedback signals from the control stick 1 to generate a control signal which is transmitted through line 49 to control motor 15 to provide appropriate force feel characteristics through the connection of the motor 15 through the gear head 11 to the control stick 1.

Figure 3:
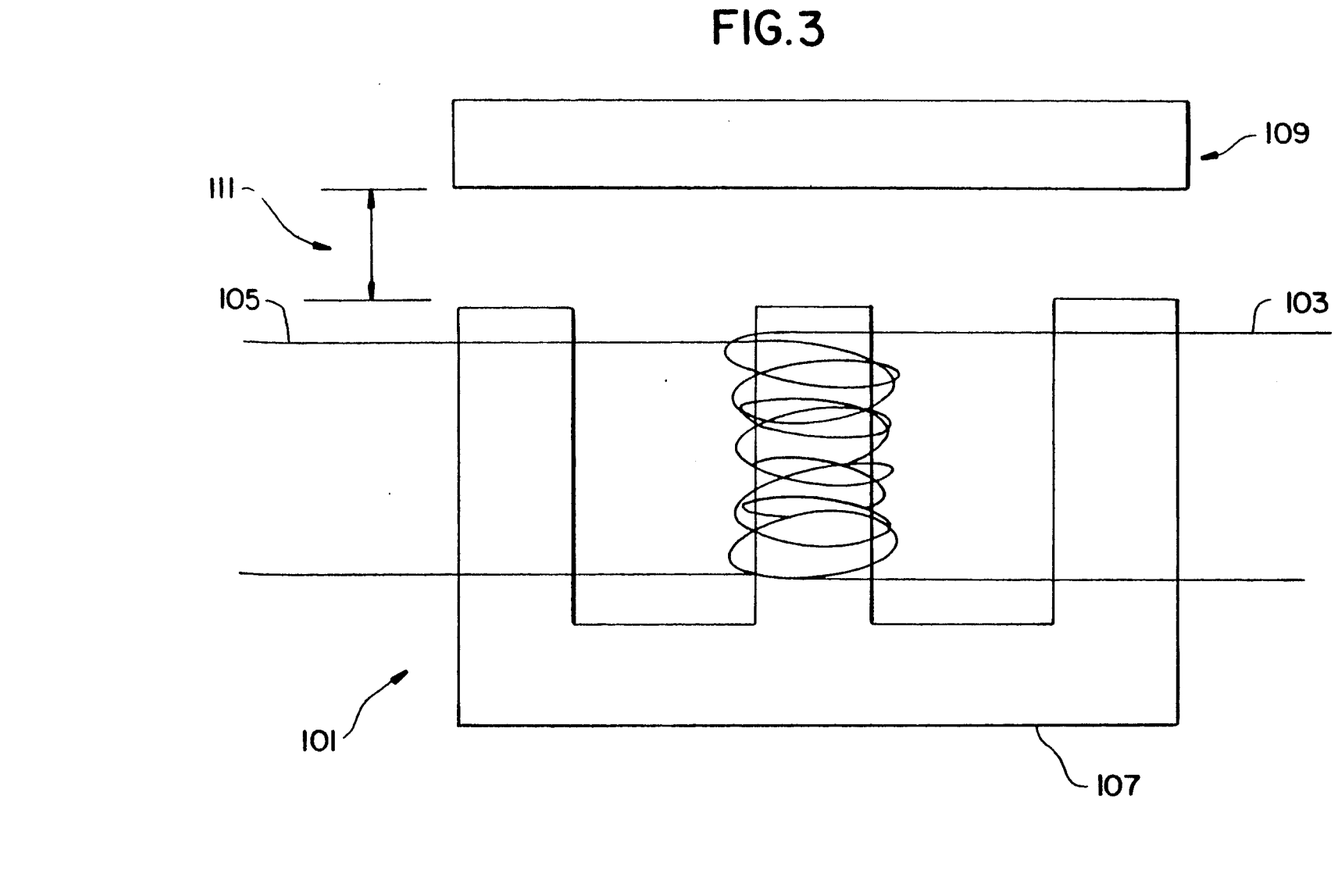
FIG. 3 is a schematic diagram illustrating the variable reluctance sensors employed in accordance with the invention.

FIG. 3 schematically illustrates the type of sensor employed in the control stick 1 of the present invention to generate a signal representative of force or torque applied to the control stick 1. More specifically, FIG. 3 illustrates a Variable reluctance transformer 101 having a core 107 with a primary winding 103 and a secondary winding 105 wound thereon. An air gap 111 separates a magnetic return path 109. The operation of this type of device is based on the principle that the primary winding 103 generates flux coupling dependent on the size of the air gap 111 distance to the return path 109. The coupled magnetic flux is measured by the secondary winding 105.

Figure 4A:
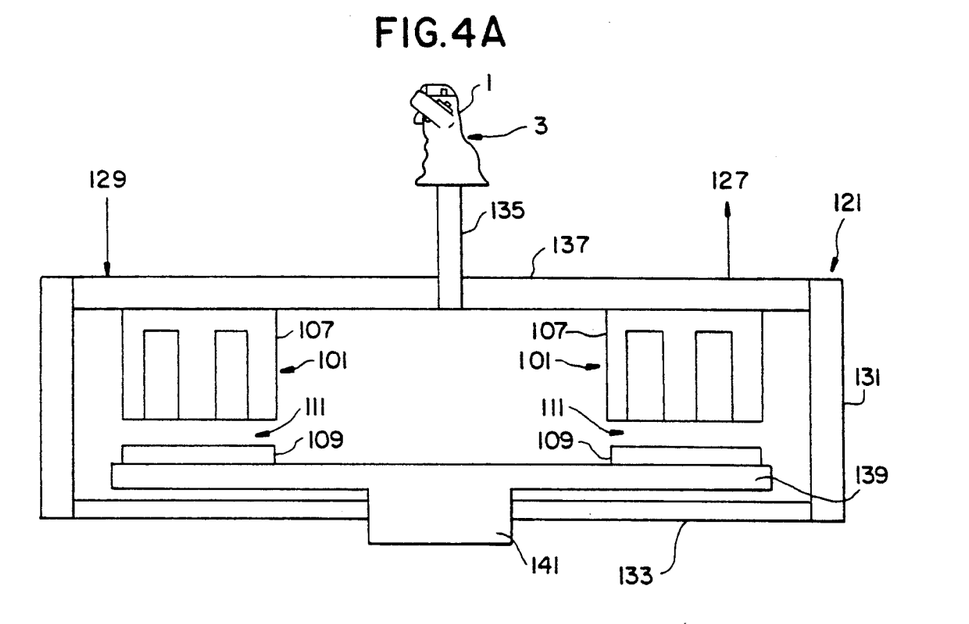
FIGS. 4a and 4b are llustrations, respectively, (not to scale and emphasing the force sensing implementaion of the invention) in side cross section and bottom planar cross sectional view, showing the manual control stick in accordance with the invention with the variable reluctance transformer sensors arranged disposed with respect to each other to detect force and movement along multiple axes.
Figure 4B:
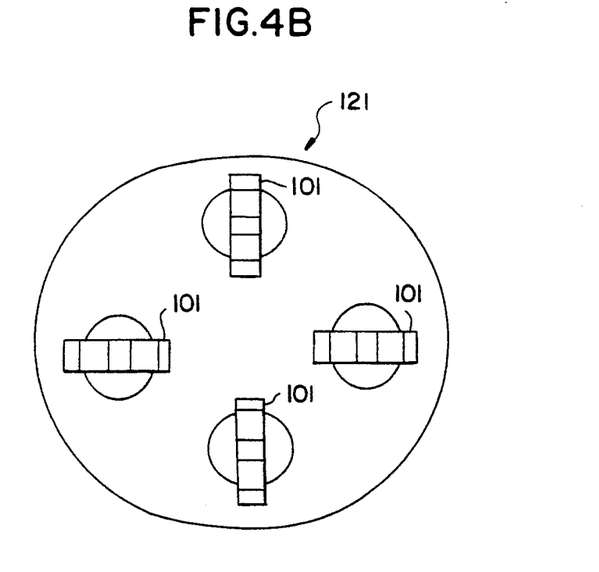

As further illustrated in accordance with FIGS. 4a and 4b, the variable reluctance transformers 101 can be employed in a push/pull arrangement such that when a force 3 is applied to the control stick 1, a downward force 129 drives one of the transformer cores downwards to narrow the air gap 111 with its return path 109 whereas an upward movement or force 127 separates its paired transformer core 107 to open up the corresponding air gap 111. In order to achieve this type of balanced push/pull effect, the control stick 1 is mounted on a rod 135 rigidly attached to an upper mounting member 137 making up part of the control stick housing 121. The upper mounting member 137 has a side wall 131 extending around the circumference thereof and the return paths 109 are rigidly mounted on a support member 139 which is connected rigidly through rod 141 which extends to be fixedly attached to the gimbal mechanism (not shown) of the device of the invention. The bottom member 133 is a flexible diaphragm having a predetermined rigidity which flexes upon application of force 3 to control stick to allow upward or downward movement of the cores 107 of the variable reluctance transformers 101. In a preferred embodiment, to maintain a push/pull arrangement along multiple axes, the control stick housing 121 includes four variable reluctant transformers arranged at about 90 degree angles from each other as shown in FIG. 4b. Other alternative configurations may be provided depending on accuracy desired as will become readily apparent to those of ordinary skill in the art.

Figure 5:
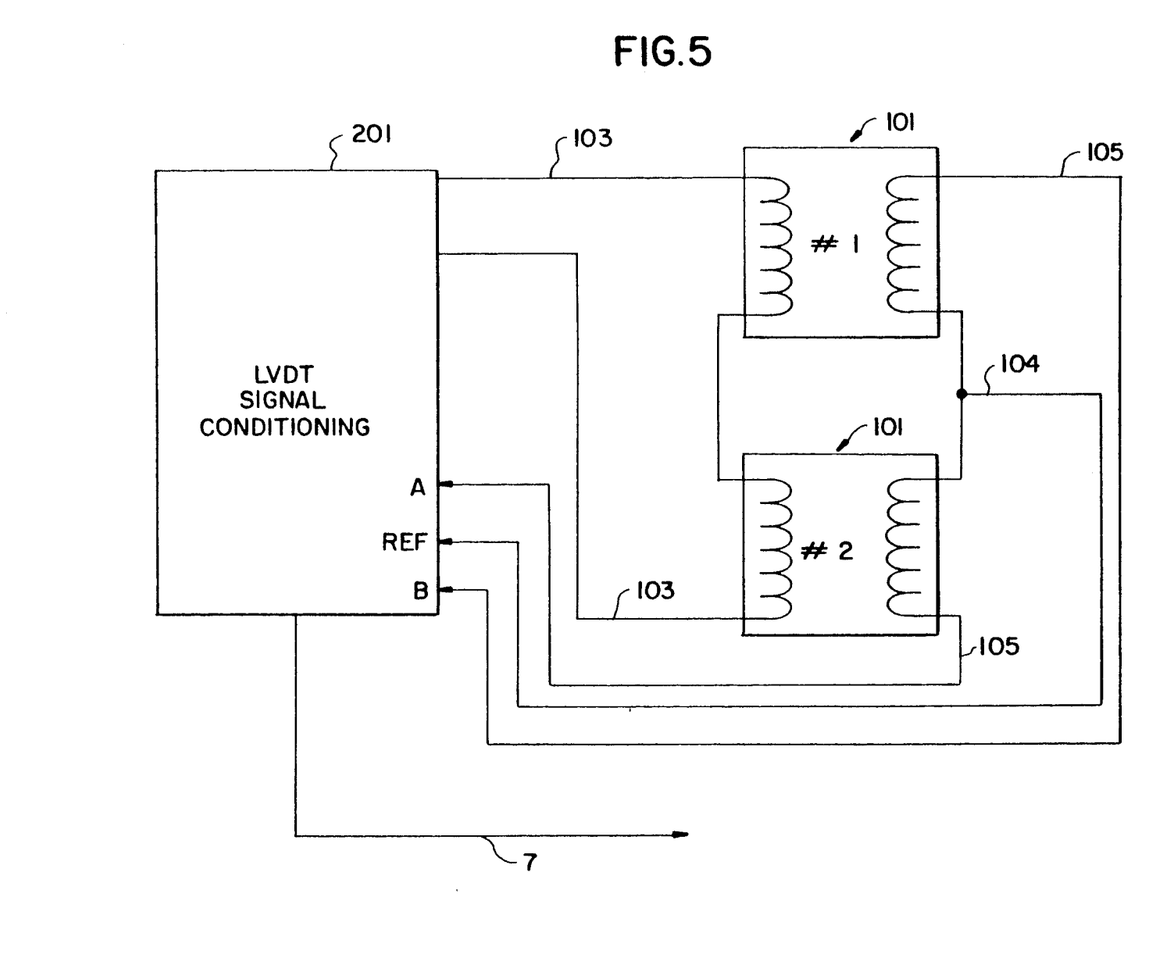
FIG. 5 illustrates the arrangement of two of the variable reluctance transformers in accordance with the invention interconnected in a push/pull configuration to provide a more accurate signal representative of torque or force exerted on the control stick.

In the preferred arrangement, the transformers are connected in pairs as shown in FIG. 5 to conventional linear variable differential transformer signal conditioning electronics 201. As shown in FIG. 5, the secondary windings 105 are connected to the signal conditioning electronics 201 which is conventional. Also connected is a reference voltage connection line 104 to balance the push/pull arrangement of the connections. This results in a signal 7 which is a direct current, i.e., DC, output of the pilot input force for use in the torque or force loop of the invention illustrated in FIGS. 1 and 2.

Figure 6:
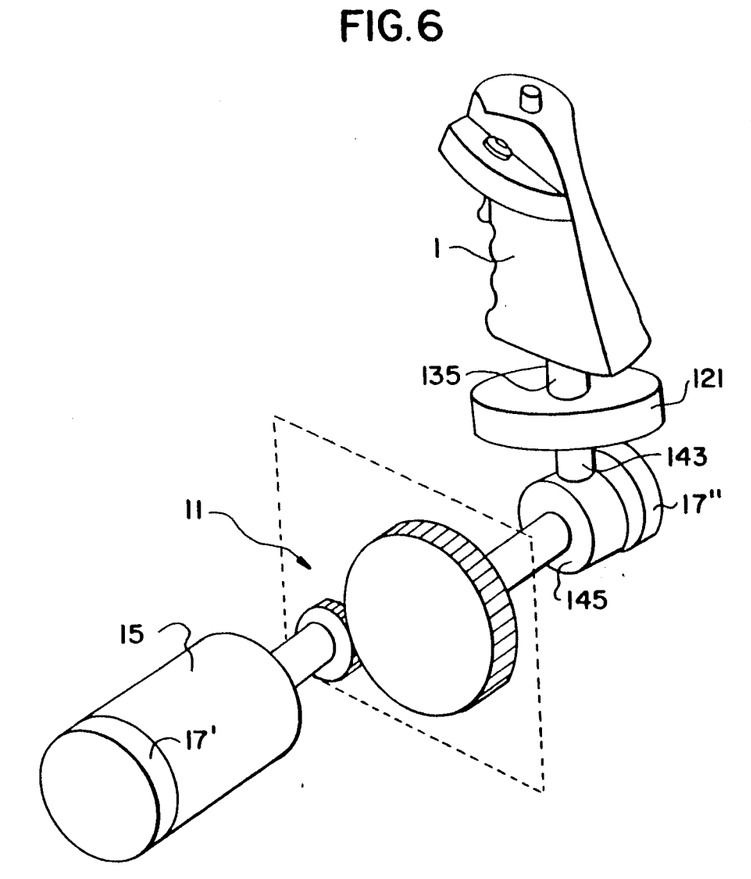
FIG. 6 is a schematic diagram of the control stick of the invention showing the interconnection between the motor and gears of the control stick, as well as the various sensors associated therewith.

To further facilitate the understanding of the invention, FIG. 6 schematically illustrates the typical control stick 1 arrangement of the invention. The hand grip is shown connected through rod 135 to the control stick sensor housing 121 which itself includes the rod 143 which supports the support member for the return path 109 fixedly connected to the gimbal 145. The gimbal, as previously noted includes preferably the position resolver 17'' for the embodiment of FIG. 2 and is connected through gear head 11 to the motor 15 which has connected thereto the resolver 17'.

Having described the invention, same will become better understood from the following claims which are intended to be non limiting.

What is claimed is:

1. In a servo system for an active hand controller comprising manual control means for being controlled by a user by movement thereof along at least one axis, position detecting means for producing a position signal representative of the position of said manual control means to a control system, said manual control means connected to a motor for having said motor exert force on said manual control means, rate detecting means for generating a rate signal representative of the rate of movement of said manual control means, summing means for summing said position signal and said rate signal, and control electronics means for processing said summed position signal and rate signal for providing a first control signal to said motor to control said motor to exert said force on said manual control means representative of said mechanical hand controller system, the improvement comprising:

force detecting means connected to said manual control means for detecting force exerted on said manual control means by said user, and for providing a signal representative of said detected force to said summing means to result in a second control signal, comprised of said first control signal summed with said signal representative of said detected force, from said motor control means to said motor for eliminating the effects of inertial forces and of operation non-linearities resulting from electromechanical connections of said manual control means.

2. A servo system as in claim 1 further comprising system signal input means connected to said summing means for providing feedback from a system being controlled by said hand controller to said manual control means representative of physical effects on the controlled system.

3. A servo system as in claim 2 wherein said signal input means is for providing an autopilot control signal from an autopilot control system.

4. A servo system as in claim 1 wherein said force detecting means comprises at least two variable reluctance transformers connected to a handle in a push/pull orientation about said handle to sense any force exerted thereon.

5. A hand controller as in claim 4 wherein said variable reluctance transformers comprise a core having primary and secondary windings thereon and a return flux path element separated from said core by an air gap, said return path element being rigidly mounted, and said core movably connected and mounted on a flexible diaphragm member for simultaneously being moved and for resisting movement thereof upon an external force being applied to said hand controller whereby the effects of movement of said core element in response to a change in the air gap is representative of the magnitude of an external force exerted on said hand controller.

6. A hand controller as in claim 1 wherein said force detecting means comprises at least two electromagnetic displacement sensing devices connected to a handle in a push/pull configuration about said handle to sense any force exerted thereon.

* * * * *

UNITED STATES PATENT AND TRADEMARK OFFICE
CERTIFICATE OF CORRECTION

PATENT NO. : 5,264,768

DATED : November 23, 1993

INVENTOR(S) : W.W. Gregory, J.W. Hegg, W.E. Lance

It is certified that error appears in the above-identified patent and that said Letters Patent is hereby corrected as shown below:

Column 1, line 7, cancel "07/957" and substitute --07/957,216--.

Column 4, line 29, after FIG., insert --1--.

Column 4, line 57, after FIG., insert --1--.

Column 5, line 34, cancel "Variable" and substitute --variable--.

Signed and Sealed this

Twenty-sixth Day of April, 1994

Attest:

BRUCE LEHMAN

Attesting Officer     Commissioner of Patents and Trademarks